United States Patent [19]

Reilly

[11] 3,721,915

[45] March 20, 1973

[54] ELECTRICALLY EXCITED FLOWING GAS LASER AND METHOD OF OPERATION

[75] Inventor: James P. Reilly, Lexington, Mass.

[73] Assignee: Avco Corporation, Cincinnati, Ohio

[22] Filed: June 29, 1970

[21] Appl. No.: 50,933

Related U.S. Application Data

[63] Continuation-in-part of Ser. No. 859,424, Sept. 19, 1969, abandoned.

[52] U.S. Cl. .................................331/94.5 PE
[51] Int. Cl. .................................H01s 3/00
[58] Field of Search.........................331/94.5

[56] References Cited

UNITED STATES PATENTS

| | | | |
|---|---|---|---|
| 3,402,367 | 9/1968 | Kobazashi | 331/94.5 |
| 3,543,179 | 11/1970 | Wilson | 331/94.5 |
| 3,351,870 | 11/1967 | Goldsmith et al. | 331/94.5 |

*Primary Examiner*—Ronald L. Wibert
*Assistant Examiner*—Conrad Clark
*Attorney*—Charles M. Hogan and Melvin E. Frederick

[57] ABSTRACT

A method of and apparatus for producing spatially uniform discharges including producing laser action in a flowing gas by electrical means using first means to create electrons and second means to maintain the optimum electron environment to produce lasing action.

Apparatus for and a method of producing spatially uniform discharges substantially throughout a large volume of gaseous medium by generating in an enclosure a substantially uniform density of free electrons in the medium and controlling the electron temperature of the free electrons to increase their average energy without substantially increasing their density that at a predetermined level and uniformity of both the density and temperature of the medium, a stable and uniform discharge is produced in the medium suitable for the intended use of the medium such as the generation and amplification of light waves by means of devices including gaseous media in which stimulated emission of radiation is provided by electrical means to create free electrons and maintain the optimum electron environment to produce lasing action, there being a particular relationship between the density of free electrons, gas pressure and gas velocity.

50 Claims, 8 Drawing Figures

JAMES P. REILLY
INVENTOR.

BY Charles M. Hogan
Melvin E. Frederick
ATTORNEYS

ELECTRICALLY EXCITED FLOWING GAS LASER AND METHOD OF OPERATION

This application is a continuation-in-part of application Ser. No. 859,424, filed Sept. 19, 1969 now abandoned.

Apparatus for and the method of producing a discharge in accordance with the invention is useful for, but not limited to, the production of lasing action, electrically conductive ionized gas for use in magnetohydrodynamic (MHD) devices and the like, or to produce chemical reactions.

The present invention in its broadest sense is directed to the production of and apparatus for providing spatially uniform useful discharges in a gas at pressure levels and volumes such that electron pair diffusion to confining walls is negligible, that is, the discharge is not wall dominated.

In a preferred embodiment, the invention comprises a high-power flowing gas laser which is volumetric in character and that can be scaled in all three characteristic dimensions as well as in pressure level. A spatially uniform discharge is created where electron-ion diffusion to the walls is negligible.

While the preferred embodiment of the present invention will be described in connection with a flowing electrically excited nitrogen ($N_2$) carbon dioxide ($CO_2$) and helium (He) laser, it may, as noted above by way of example, be applied to other systems where a conducting ionized gas is required or useful and including, but not restricted to, gas constituents other than $N_2$, $CO_2$ and He as well as other lasing systems. In a lasing environment, a discharge in accordance with the invention has the correct electron temperature for most efficient laser operation. Moreover, a laser in accordance with the invention is volumetric in the sense that the proper gas temperature and lower laser state concentrations are maintained by means other than diffusion through the gas to cooled side walls.

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range included the near ultraviolet, the visible and the infrared. The coherence of the beam is particularly important because it is that property which distinguishes laser radiation from ordinary optical beams. On account of its coherence, a laser beam has remarkable properties which set it apart from ordinary light which is incoherent. While the maser (microwave amplification by stimulated emission of radiation) and the laser are based on the same principles of statistical and quantum mechanics, the problems and the physical embodiments for achieving laser action are completely different from those for masers.

Coherence, the essential property of lasers is of two kinds: spatial and temporal. A wave is spatially coherent over a time interval if there exists a surface over which the phase of the wave is the same (or is correlated) at all points. A wave is time-coherent at an infinitesimal area on a receiving surface if there exists a periodic relationship between its amplitude at any one instant and its amplitude at later instants of time. Perfect time coherence is an ideal since it implies perfect monochromaticity, something which is forbidden by the uncertainty principle.

Laser beams have a number of remarkable properties. Because of their spatial coherence, they have an extremely small divergence and are therefore highly directional. For example, a ruby laser beam one inch in diameter at the source will be about four feet across on a surface ten miles away. The very best that could be accomplished over the same distance with an incoherent source, such as an arc lamp at the focus of a 6-foot parabolic mirror, would be a beam spread over an area more than one-third of a mile across. Another important feature of lasers is the enormous power that can be generated in a very narrow wave length range. Under certain operating conditions, monochromatic bursts of millions of watts can be produced. To get comparable radiation intensity from a black body, it would have to be raised to a temperature of hundreds of millions of degrees—a condition not practically achievable. A laser beam, because it possesses space coherence, can be focused to form a spot whose diameter is of the order of one wave length of the laser light itself. Enormous power densities are thus attainable. For example, the focused output of a 50-kilowatt infrared burst from a laser can have a radiant power density of the order of $10^{12}$ watts/$cm^2$; this is about 100 million times the power density at the surface of the sun. Extraordinarily high temperatures, orders of magnitude greater than that at the sun, can be generated at the small area which absorbs this concentrated radiation. Furthermore, since the electric field strength of an electromagnetic wave is proportional to the square root of its intensity, the field at the focus of the laser beam can be millions of volts per centimeter. The most promising potential of lasers comes from time coherence. It is this property which permitted prior art exploitation of radio and microwaves for communications. However, laser frequencies are millions of times higher than radio frequencies, and hence are capable of carrying up to millions of times more information. In fact, one single laser beam has in principle more information-carrying capacity than all the combined radio and microwave frequencies in use at the present time.

Accordingly, systems applications of lasers are useful for communication in space, on earth, and under sea. Military surveillance and weapons systems, mapping, medical, and computer technology may also include lasers.

Two conditions must be fullfilled in order to bring about laser action: (1) population inversion must be achieved and (2) an avalanche process of photon amplification must be established in a suitable cavity such as, for example, an optical cavity. Population inversion, can be accomplished if (1) the atomic system has at least three levels (one ground and at least two excited levels) which can be involved in the absorption and emission processes and (2) the spontaneous emission lifetime of one of the excited states is much longer than that of the other or others.

When a system is in a condition where light (photon) amplification is possible, laser action can be achieved by providing (1) means for stimulating photon emission from the long-lived state, and (2) means for causing photon amplification to build up to extremely high values. In the usual embodiment, this is accomplished by fashioning the medium containing the active atoms into a cylinder with perfectly (as far as possible) parallel ends polished so highly that the surface roughness is measured in terms of small fractions of a wave length of light. The ends are silvered or dielectric coated to behave as mirrors which reflect photons coming toward them from the interior of the cylinder. Such a structure, whether the mirrors are within or outside the container, is called an optical cavity. If now pumping means, such for example an intense source, acts on the medium and brings about population inversion of the long-lived state with respect to another lower energy excited state even though the long-lived state is only relatively long-lived, in a small fraction of a second there will be spontaneous emission of photons. Most of these photons will be lost to the medium but some of them will travel perpendicular to the ends and be reflected back and forth many times by the mirrors. As these photons traverse the active medium, they stimulate emission of photons from all atoms in the long-lived state which they encounter. In this way the degree of light amplification in the medium increases extraordinarily and because the photons produced by stimulated emission have the same direction and phase as those which stimulate them, the electromagnetic radiation field inside the cylinder or cavity is coherent. In order to extract a useful beam of this coherent light from the cavity, one (or both) of the mirrors is made slightly transmissive. A portion of the highly intense beam leaks through the mirror, and emerges with plane-parallel, regularly spaced wavefronts. This is the laser beam.

Parallelism of the mirrors is a rigorous geometrical requirement. If the mirrors are not precisely parallel, the light rays that build up in the cavity will tend to digress further and further toward the edges of the mirrors as they are reflected back and forth between the mirrors, and finally they will be directed out of the cavity altogether. It is essential that any deviation from parallelism be so small that the coherent photon streams will reflect back and forth a very large number of times to build up the required intensity for laser action. In a conventional well-made laser cavity the angle that one mirror makes with the other (called wedge angle) is about 2 seconds of arc. Satisfactory wedge angles may be achieved, for example, with micrometer adjustments. Use of spherical mirrors eases somewhat the rigorous requirements for keeping the still-amplifying beam in the cavity because spherical surfaces of the proper radius tend to reflect off-axis beams toward the center of the cavity. The laser radiation which emerges from a spherical mirror has spherical wave fronts and thus is divergent. However, since such coherent wave fronts appear to originate from a common center, they can be, by use of a lens, made plane-parallel and hence, except for diffraction effects, non-divergent.

By way of example, a continuously operating gas laser is disclosed in an article, "Population Inversion and Continuous Optical Maser Oscillation in a Gas Discharge Containing He-Ne Mixture, " Physical Review Letter, 6, page 106, 1961. In the usual embodiment of static gas, prior art gas lasers, the gas is statically contained in a tube about 100 centimeters long. The mirrors which form the ends of the optical cavity are disposed either inside the tube or external to it. Pumping is accomplished in this system by electrical excitation (either radio frequency or direct current).

In addition to the helium-neon gas laser system, other gas laser systems, have been achieved with helium, neon, argon, krypton, xenon, oxygen, and cesium (the last optically pumped in the gaseous state) as emitting atoms.

Other systems include carbon dioxide, helium, and nitrogen. For a more complete discussion of the high-power flowing system including carbon dioxide, helium, and nitrogen reference is made to patent application of C.K.N. Patel, Ser. No. 495,844, filed Oct. 14, 1965 and now abandoned and assigned to Bell Telephone Laboratories, Inc. Such a high-power laser typically includes two reflectors forming a suitable resonator or cavity, a tube forming the sidewalls of the laser, suitable pumping apparatus including a cathode, anode and direct-current sources connected in appropriate polarity between the anode and the cathode; inlet apparatus; a source of carbon dioxide, helium, and nitrogen connected to the inlet apparatus; and equipment for exhausting the spent gases from the laser or for cooling and separating them for reuse.

As indicated hereinabove, a laser output may be generated in various media (i.e., crystals, semiconductors and gases) by pumping or introducing energy to create an inversion where a large number of the atoms are in high energy levels to support photon emission. In prior art gas lasers, whether flowing or static, the lasers were pumped or excited by using a diffusion controlled electrical discharge in a small tube maintained at a low pressure. Typically, in such gas discharge tubes (typically of the order of one centimeter in diameter) operating at low pressures (about 1–10 torr) there is a loss of electron-ion pairs from the center of the plasma to the sidewalls of the tube by radial diffusion (so-called ambipolar diffusion of ion-electron pairs). For a steady state operation of the discharge, this loss must be made up by a net ionization rate in the plasma which exactly balances the diffusion loss rate. This required ionization rate dictates what temperature the electrons must have to sustain the discharge, and hence what applied E/N is needed to give the electrons that temperature. For long tubes E/N is defined by the applied voltage divided by the tube length and gas density.

In such situations the discharge can be said to be "-ballasted" by the tube walls, i.e., since radial diffusion of the electron-ion pairs is fast, any small local increase in electron density is reduced by diffusion. This fact makes such discharges radially and axially uniform as well as quite reliable and simple to produce.

The plasma (neutral gas plus electron-ion pairs) contained inside the electric discharge tube tends to remain radially uniform as long as the time required for the electron-ion pairs to diffuse to the surrounding walls is equal to the ionization time such as, for example, the time required to double the electron density. Since the ambipolar diffusion time is generally proportional to the product of the gas pressure and the tube diameter squared for large diameters, this ambipolar diffusion time can, under some circumstances, become long compared to the ionization time in the tube, especially for high ionization rates, large diameter tubes and high pressures. In this latter situation, the discharge is no longer "ballasted" by the presence of the tube walls, i.e., local increases in the electron density are not immediately diffused to the walls where they are reduced by wall recombination, etc. Accordingly, local nonuniformities can be produced by these higher electron densities and the fast-growing non-uniformities can become worse. Often the result is that the previously uniform glow discharge turns into arcs, streamers or current spokes. This latter condition often is a plasma that is very inefficient, and often useless for certain purposes.

From the above it will be seen that in high-pressure, large diameter discharge tubes the tendency is for any local increase in electron density not to be damped by diffusion to the confining walls. Upon occurrence of such disturbances one can reduce their tendency to grow by reducing the ionization rate which means a lower electron temperature since the local ionization rate is a function of the local electron temperature. A lower electron temperature, however, requires that a lower electric field must be applied. The proper balance is a critical one: too high an electric field can allow the high pressure large diameter discharge to "-spoke," but if too low an electric field is applied, the discharge cannot be started in the first place. Further, at high pressures, it is generally found that an applied voltage or electric field large enough to start a discharge is also large enough to cause the discharge to be radially non-uniform and, for example, "spoke".

The present invention is directed to the production of and apparatus for providing spatially uniform useful discharges in flowing gas lasers at pressure levels and sizes such that electron-ion pair diffusion to the confining walls is negligible, that is, the discharge is not wall dominated and is a true volume discharge.

It must be emphasized, however, the method and apparatus used in the production of said volumetric discharge is not limited to flowing gas lasers as noted below. Such volumetrically scalable spatially uniform discharges find uses in many other types of devices which use plasma for propulsion, pumping, power generation, chemical processing, and the like.

In its preferred embodiment, the present invention comprises a high power flowing gas laser which is truly volumetric in character and that can be scaled in all three characteristic dimensions as well as in pressure level. A spatially uniform discharge is created where electron-ion diffusion to the walls is truly negligible.

While the preferred embodiment of the present invention will be described in connection with a flowing electrically excited nitrogen ($N_2$) carbon dioxide ($CO_2$) and helium (He) laser it may be applied to other systems where such a plasma is required, including, but not restricted to, lasers with gas constituents other than nitrogen, carbon dioxide and helium as well as other lasing systems. A discharge in accordance with the invention has the correct electron temperature for most efficient laser operation. Moreover, a laser in accordance with the invention is volumetric in the sense that the proper gas temperature and lower laser state concentrations are maintained not by diffusion through the gas to cooled sidewalls, but rather by the proper choice of gas flow velocity.

The following references and materials cited herein describe some of the background and physical principles involved in the present invention and an insight, to some degree, of the application of those principles in the present state of the art:

1. Von Engel: "Ionized Gases" Oxford University Press, London, 1955.

2. Bridges and Patel: "High Power Brewster Window Laser at 10.6 Microns" Appl. Phys. Lett. 7, 244 (1965).

3. Shapiro: "Dynamics and Thermodynamics of Compressible Fluid Flow," Vol. 1. Ronald Press, N. Y., 1953.

4. Engelhardt, Phelps and Risk: "Determination of Momentum Transfer and Inelastic Collision Cross Sections for Electrons in Nitrogen Using Transport Coefficients," Phys. Rev. 135, No. 6A, September 1964, p. A1566.

5. Phelps: "Rotational and Vibrational Excitation of Molecules by Low Energy Electrons," Westinghouse Research Laboratories, Scientific Paper 67-1E2-GASES-P2, 1967.

6. Cobine: "Gaseous Conductors," Dover Publications, N. Y., 1958.

7. Frost and Phelps: "Momentum-Transfer Cross-Sections for Slow Electrons in He, Ar, Kr and Xe from Transport Coefficients," Phys. Rev. Vol. 136, No. 6A, December 1964.

8. Engelhardt, Phelps and Risk: "Determination of Momentum Transfer and Inelastic Collision Cross Sections for Electrons in $N_2$ using Transport Coefficients," Phys. Rev. Vol. 135, No. 6A, September 1964.

9. Hake and Phelps: "Momentum-Transfer and Inelastic-Collision Cross Sections for Electrons in $O_2$, CO and $CO_2$," Phys. Rev. Vol. 158, No. 1, June 1969.

10. Cheo, "Effects of Gas Flow on Gain of 10.6 Micron $CO_2$ Laser Amplifiers", Journal of Quantum Electronics, Vol. QE-3, No. 12, December 1967.

11. Guentherschulze, "Der Kathodenfall der Glimmentladung in Abhaengigkeit von der Stromdichte Bei Spannungen Bis 3000 volts," Zeit, f. Physik, 38, p. 575, 1956.

12. Schönhuber: "Breakdown Below $(Pcl)_{min}$," Proceedings of the 7th Conference on Phenomena in Ionized Gases, Beograde, Jugoslavia, 1965, Beograd, Gradevinska Knjiga, 1966.

It is an object of the invention to provide apparatus for and a method of producing spatially uniform discharges in a gaseous medium.

It is another object of the invention to provide a spatially uniform discharge in a gaseous medium in a controlled manner with small effect on background temperature, density and pressure of the medium.

A still further object of the invention is to provide apparatus for and a method of producing controlled, large, volumetric discharges without the inherent ionization instability that occurs when the discharge current itself produces the ionization.

A further object of the invention is to provide apparatus for and a method of producing spatially uniform discharges in a gaseous medium that can be used, for example, to provide a lasing medium and other applications where a conducting gaseous medium is necessary or useful to achieve a desired result.

It is another object of the present invention to provide apparatus for and a method of producing a population inversion suitable for use in a gas laser oscillator or amplifier.

It is another object of the present invention to provide apparatus for and a method of producing laser action in a flowing gas by electrical excitation.

It is a further object of the present invention to provide a gaseous laser that is volumetrically scalable.

A still further object of the invention is to provide a method of and apparatus for controlling the gas temperature in a gaseous laser by proper choice of gas flow velocity and input power to increase the efficiency of the lasing of the gaseous laser.

A still further object of the present invention is to provide a method of an apparatus for producing laser action in a flowing gas by generating free electrons, and an electrical discharge to maintain the optimum electron environment to produce the lasing action.

A still further object of the present invention is to provide a method of an apparatus for producing laser action in a flowing gas by electrical excitation comprising a short high voltage pulse to create electrons and a DC discharge to maintain the optimum electron environment to produce lasing action.

A still further object of the invention is to provide an electrically excited flowing gas laser wherein the arrangement of the electrical excitation means results in optimum optical qualities.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGS. 6 A, B and C are plots showing the effect of gas temperature for various ratios of volumetric free electron density $n_e$ in the gas to the pressure P of the gas required to produce high power and efficient volumetrically scalable flowing gas lasers.

Figure 1:
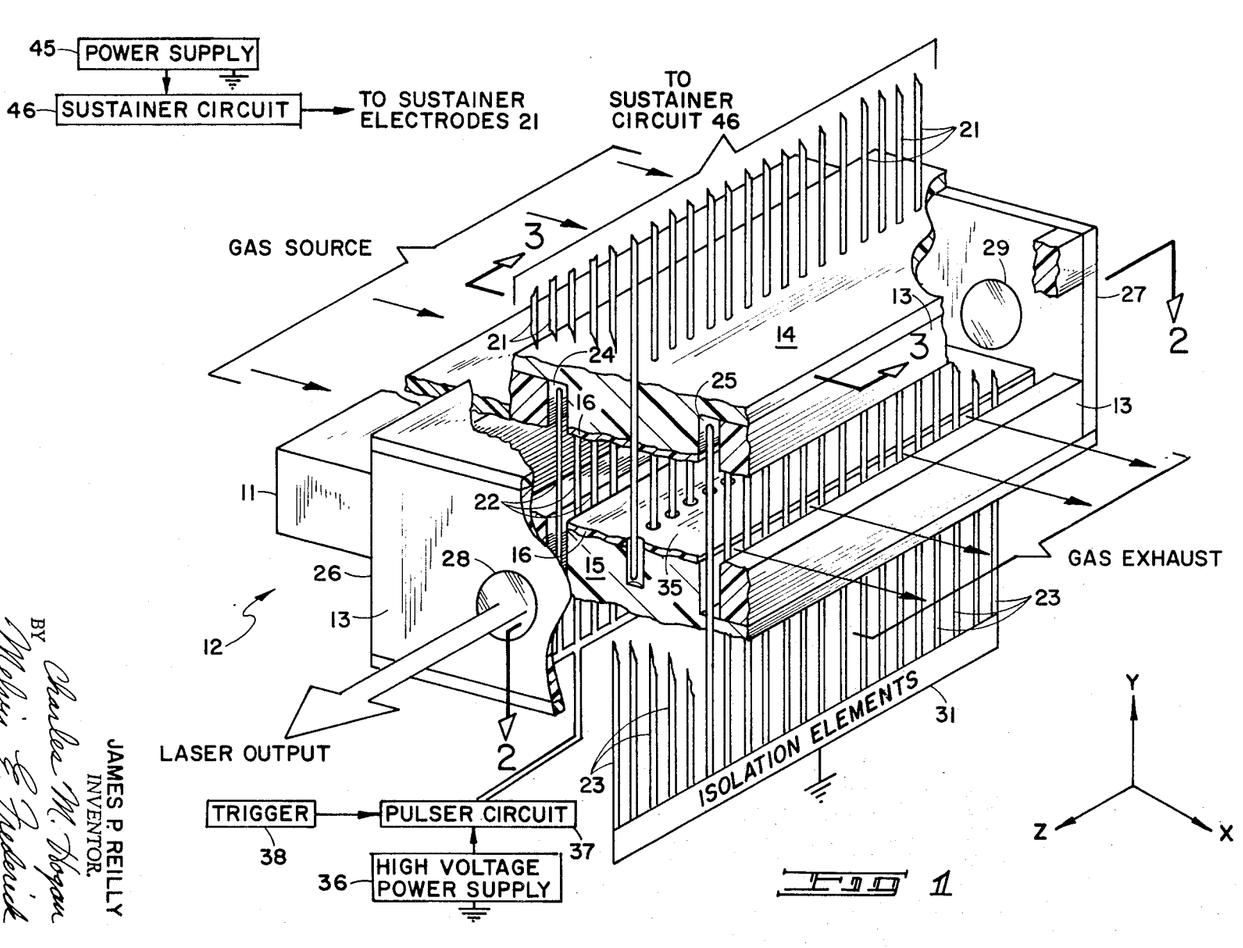
FIG. 1 is a perspective view with parts broken away of apparatus in accordance with the invention.
Figure 2:
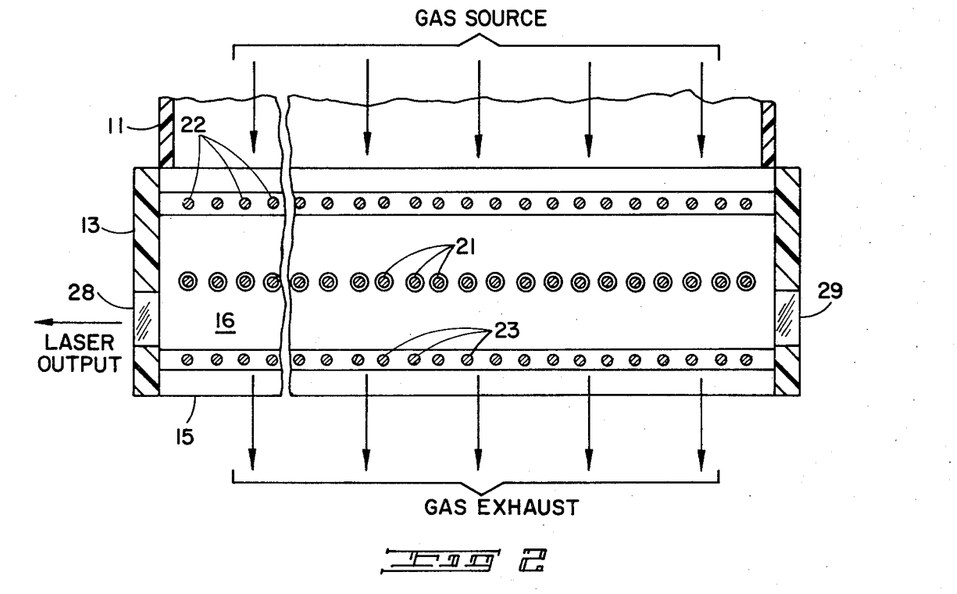
FIG. 2 is a top sectional view taken on lines 2—2 of FIG. 1.
Figure 3:
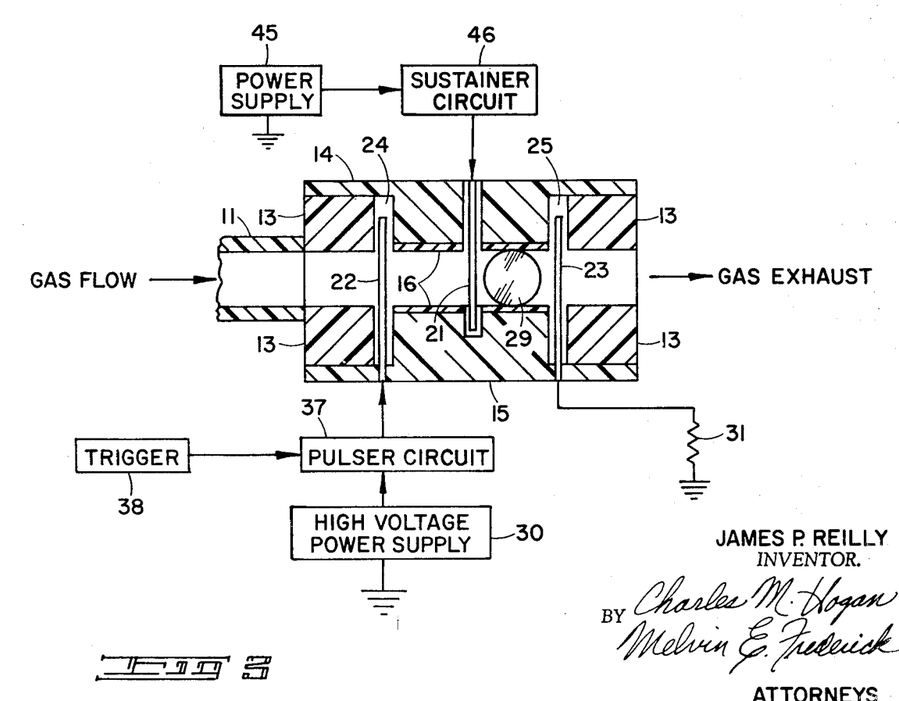
FIG. 3 is a sectional end view taken on lines 3—3 of FIG. 1.

Attention is now directed to FIGS. 1-3 which illustrate a preferred embodiment of the invention. A gaseous medium capable of producing lasing action such as, for example, a mixture comprising 16% $CO_2$, 34% $N_2$ and 50% He is supplied from a suitable source such as a plenum chamber and diffuser (not shown) to the working section of the laser via gas inlet means 11. The working section of a laser in accordance with the invention generally designated by the numeral 12 may be as shown generally rectangular in configuration and comprise a frame 13 for removably receiving oppositely disposed top and bottom sections 14 and 15 each adapted to receive a plurality of electrodes as shown and more further described herein below. The working section 12 is preferably comprised of an electrically nonconductive material as, for example, Lucite, Melamine, Fiberglass-Epoxy, and the like with the inner surfaces covered with a suitable nonablative and electrically nonconductive material 16 such as quartz.

The top and bottom sections 14 and 15 may be made removable as shown to facilitate operation and repair.

Sealably carried in the center portion of the top section 14 are a plurality of electrodes spaced one from another and hereinafter referred to collectively as sustainer circuit electrodes 21. The sustainer circuit electrodes 21 extend through the top section 14 in the Y direction, through the space defined by the top and bottom sections and into the bottom section 15 such that their ends are recessed below the inner surface of the bottom section 15. Similarly, the bottom section is sealably provided with a plurality of electrodes spaced one from another which are located respectively in the upstream and downstream portions of the bottom section. These electrodes 22 and 23 extend through the working section and into grooves 24 and 25 defined by the frame 13 and top section 14. The upstream electrodes are hereinafter collectively designated by the pulser circuit electrodes 22 and the downstream electrodes are hereinafter collectively designated the common cathode electrodes 23. The tops of all of the electrodes are recessed in order to insure uniform discharge in the active flowing gas medium by preventing arcing from the tips of the electrodes. Disposed in the end walls 26 and 27 of the frame 13 are respectively mirrors 28 and 29 which define for the embodiment disclosed an optical cavity or lasing region between the sustainer circuit electrodes 21 and the common cathode electrodes 23. Broadly, the lasing region is not limited to any one specific location and may include a quite large region downstream of electrodes 22. The mirrors 28 and 29 are of conventional configuration and type adequate to define an optical cavity as are well known in the prior art. The cathode electrodes may be connected to ground through isolation elements 31 such as resistors and/or capacitors.

Excitation and inversion of the gaseous medium in the region 35 intermediate the sustainer electrodes 21 and common cathode electrodes 23 is provided by a two-step process. Broadly, a high voltage discharge may be provided between the pulser circuit electrodes 22 and common cathode electrodes 23 by means of a conventional high voltage power supply 36, pulser circuit 37 and a trigger circuit 38. The pulser circuit may comprise, by way of example, a capacitor and a spark gap having a trigger electrode (not shown) triggered by a conventional oscillator-type trigger circuit. The capacitor is charged by the high voltage power supply and coupled to the pulser electrodes via the spark gap. In order to continuously maintain optimum lasing conditions in the lasing region 35 a second discharge is provided between the sustainer electrodes 21 and the common cathode electrodes 23 by means of, for example, a conventional DC power supply 45 and sustainer circuit 46 comprising a plurality of capacitors each in series with a resistor. Alternately, an AC power supply may be used with appropriate circuitry. The capacitors and resistors referred to hereinabove may be replaced by resistors or inductors. The aforementioned capacitors and resistors are each individually coupled to the power supply 45 and one of the sustainer electrodes in order to insure that each anode-cathode pair carries current through the gas about equally. In one successful embodiment of the invention the working section 12 included 44 pulser electrodes 22, 44 sustainer electrodes 21 and 44 common cathode electrodes 23, as shown in FIG. 1, the spacing between the electrodes being about 2.54 cm in the X direction and about 0.60 cm in the Z direction. The upstream electrodes were about 0.05 cm in diameter. In this particular case the distance between the top and bottom sections 14 and 15 was 2.54 cm and the distance in the Z direction between mirrors 28 and 29 was about 30 cm.

The direction of laser output is perpendicular to the direction of flow of the gas and as indicated in drawing is in the Z direction, the direction of gas flow being in the X direction, and preferrable substantially along the length of the longitudinal axis of the cavity. The optical cavity 35 is bounded by the sustainer electrodes 21 and common cathode electrodes 23 and the mirrors 28 and 29. In accordance with conventional practice one of the mirrors such as, for example, mirror 29 is highly reflecting at the proper frequency and the other (mirror 28) is partially reflecting and partially transmissive to permit an output. As previously mentioned, the working gas passed through the working section in the X direction as shown. The gas may be supplied at a pressure of, for example, 15 torr at a velocity of Mach 0.2. A suitable pump (not shown) may be provided and coupled with the outlet of the working section to provide the desired pressure.

It is to be understood, however, that lasing action may be obtained even downstream of electrodes 23, and that accordingly, excitation of the working medium can be provided in a cavity or region separate from the working or lasing region where the desired population inversion or laser action is utilized.

As shown only by way of example in FIGS. 1-3, the present invention comprises broadly a flowing gas laser which is truly volumetric in character and that is scalable in all three characteristic dimensions as well as in pressure level. A spatially uniform discharge, more fully described hereinafter is created in the working region wherein electron-ion diffusion to the walls in the flowing gas is negligible. It is to be understood that the present invention is useful with gases other than that described in connection with the preferred embodiment, a discharge to effect pumping being provided to produce the correct electron temperature for most efficient laser operation. Moreover, a laser, in accordance with the invention, is volumetric in the sense that the proper gas temperature and lower laser state concentrations are maintained not by diffusion through the gas to cooled sidewalls, but rather, inter alia, by the proper choice of gas flow velocity.

Two problems found to be associated with producing a lasing medium which is truly volumetric and which are overcome by the present invention are control of gas temperature and discharge uniformity.

To facilitate an understanding of the invention, the problems first of gas temperature control and then the provision of a uniform discharge will now be discussed.

Directing attention now to gas temperature control consider first conventional $N_2$-$CO_2$-He lasers pumped by means of a DC discharge. In the DC discharge-tube of such $N_2$-$CO_2$-He lasers, the gas therein is cooled by heat diffusion to typically water-cooled sidewalls and is kept uniform by the above as well as ambipolar diffusion of ion-electron pairs. It can be shown by a simple equation well known in the art that in such a DC steady-state situation, the energy balance for the gas in the tube together with the thermal conductivities of the gases used and the known maximum tolerable amount of gas heating allowed, limits the maximum amount of heat that can be conducted through the gas to cooled sidewalls to the order of 100–200 watts per meter of length of tube, depending to some extent on the helium fraction used. Accordingly, since the maximum efficiency of the $N_2$-$CO_2$-He laser system is about 40 percent, the aforementioned heat loss of 100–200 watts per meter of length is also about the maximum amount of laser power obtainable per meter from a steady state wall-cooled $N_2$-$CO_2$-He laser discharge tube. In actual tests, up to 75 watts of laser power have been obtained per meter of discharge tube in steady-state DC operation. The aforementioned limit of such gas lasers is imposed by the requirement that the gas be cooled by the walls of the confining tube. The axial ($x$) and radial ($r$) temperature distribution in a flowing thermally conducting gas is given by the total energy equation $$\rho U C_p (\delta T_o/\delta x) + (1/r) (\delta/\delta r) r\lambda (\delta T/\delta r) = Q \quad (1)$$

Where $\rho$ = the gas density, $U$ = the gas velocity, $C_P$ = the gas specific heat, $\lambda$ = the gas thermal conductivity, $r$ = the radial distance, $x$ = the axial distance, $Q$ = the uniform volumetric heat generated, $T$ = the gas temperature, and $T_o$ = the stagnation temperature. The first or heat convection term in equation (1) is the axial rise of gas temperature and is dependent on the gas pressure and flow velocity. The second or heat conduction term (the term to the left of the equal sign) is the heat conducted by the gas to the confining walls; and the third or heat source term, $Q$, is a gas-pressure dependent volumetric heat source.

It may be seen from the equation (1) above that if the heat source term, $Q$, is balanced by the second or heat conduction term, an allowable tube diameter which is pressure-dependent is dictated to prevent over-heating of the gas. However, if the heat source term, $Q$, is balanced by the first or heat convection term in equation (1), no such dependence on tube radius results. Moreover, since the heat source term and heat convection term are both proportional to gas pressure, such pressure level effects tend to cancel out. That is, a higher pressure permits more energy input into the gas, but also results in a greater ability of the gas to store this energy before a temperature rise sets in. So far as bulk cooling alone is concerned, in the development of the present invention it was found that in order to have the temperature of the bulk of the gas controlled by flow rather than wall cooling, it is only required that the travel time of gas particles through the working chamber of the laser be fast compared with the diffusion time of that particle from the center of the medium to the walls, i.e., the thermal boundary layers on the wall be thin compared to the height of the channel.

For a parallel plate geometry, with a given plate spacing, gas velocity, and axial length the criterion for thin thermal boundary layers is that the time for thermal diffusion across the plate spacing be long compared to the flow time through the length and is given by the relation:

$$(\rho c_p/\lambda)(H/2)^2 \gg L/U \quad (2)$$

where $\rho$ = the gas density (directly proportional to pressure P), $c_p$ = the gas specific heat (independent of pressure P), $\lambda$ = the gas thermal conductivity (independent of pressure), $H$ = the plate spacing, $U$ = the gas flow velocity, and $L$ = the axial length of the plates. For typical values of gas pressure P equal to 10 torr of pure helium and an $H$ of 10 cm, a thermal diffusion time of about 1 second results. For a channel length, $L$, of about 100 cm and a flow velocity of Mach 0.1 (30 meters per second) the travel time is 0.030 seconds. Accordingly, it will now be seen that for the case set forth, travel time will be much shorter than the thermal diffusion time thereby resulting in thin thermal boundary layers. With such thin thermal boundary layers the temperature of the bulk of the gas will be flow controlled.

However, it was also found that the provision of thin boundary layers per se referred to above was not sufficient for the choice of flow velocity. As a result of a detailed study, it was found that there must exist a match of gas flow velocity, gas pressure level, gas temperature, electron density, and average electron energy to provide a high power, efficient and volumetrically scalable flowing gas laser such as, for example, the $N_2/CO_2/He$ laser described hereinabove.

It is to be understood that while the technique now to be described was developed with a gas mixture of $N_2/CO_2He$, it is applicable to other lasing systems and that other gases may be added if required or desired. The previous discussion about thin thermal boundary layers is significant as the starting point for determining the aforementioned relationship of velocity, pressure and cavity dimensions.

Equation (2) may be used to determine the minimum flow velocity necessary through a given device operating at a given pressure level to provide a balance of flow cooling against power input to the gas. However, the level to which the gas temperature can be allowed to rise is most important and will now be discussed in terms of the gain of the flowing $N_2/CO_2/He$ laser described above.

The gain of any laser medium is in general proportional to the difference between the population of the upper and lower laser states (hereinafter designated respectively $X_U$ and $X_L$) of the system. If the upper laser state is more highly populated than the lower state ($X_L > X_L$) then the gas or system is said to possess a population inversion and it can, in general, be made to produce laser action.

Figure 6A:
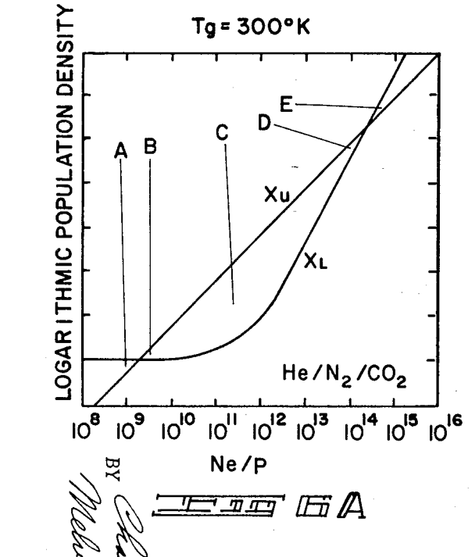
Figure 6B:
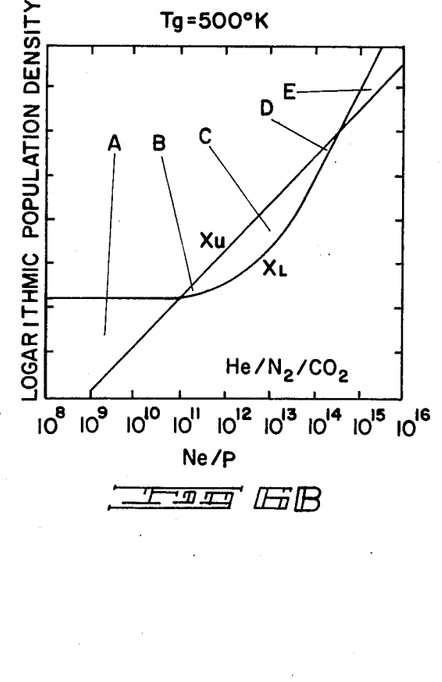
Figure 6C:
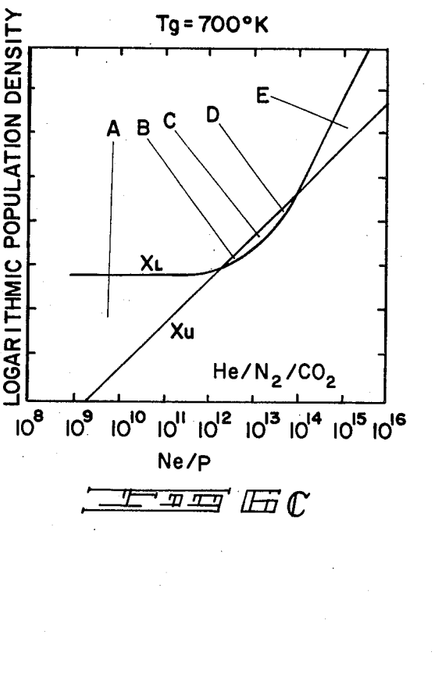

FIGS. 6 A, B and C show by way of example for a 3/2/1 mixture of $He/N_2/CO_2$, the upper and lower laser state population $X_U$ and $X_L$ attained in an electrically-excited volumetric laser at a given volumetric electron density $n_e$ and pressure level P, low laser flux conditions for gas temperatures of respectively 300°K, 500°K and 700°K. The electrical discharge region and laser cavity were coincident for purposes of these illustrative plots, although this is not in general required. Using the plots shown in FIG. 6 A, B and C it will now be shown that a proper gas velocity must be chosen to prevent excessive gas temperature rise and hence inefficiency in the laser cavity with a given volumetric free electron density $n_e$ at a given pressure level P. For purposes of this discussion it is assumed that the electrons are at or near the optimum electron temperature for laser excitation.

In apparatus in accordance with the invention, there exists, in general, five regions A to E of population differences. In region A the ratio of laser upper state excitation by electrons to de-excitation by background gas molecules ($n_e/P$) is not sufficiently high to provide a population inversion. Accordingly $X_L > X_U$, and no lasing can occur. In region B the ratio $n_e/P$ is higher than in region A and population inversions are created ($X_L < X_U$) but the population of the upper laser state is not substantially greater than that of the lower laser state. Accordingly, only highly inefficient lasing occurs. In region C the ratio $n_e/P$ while moderate, is higher than that in region B and $X_L \ll X_U$. Here an efficient inversion is made, and useful lasing action occurs. The boundary between regions B and C is where $X_L$ is about one-fifth to one-half of $X_U$. In region D the ratio $n_e/P$ is higher than in region C but the upper state population $X_U$ is now sufficiently high that collisional deactivation of $X_U$ produces a lower state population $X_L$ such that again the net difference between $X_U$ and $X_L$ is reduced to about that existing in region B. Accordingly, laser gain is reduced by at least a factor of 2 from that existing in region C and only highly inefficient lasing action occurs. In region E no population inversion is obtained (as in region A) because of the existance of an improper balance between excitation rates and de-excitation rates.

From the preceding discussion and FIGS. 6 A, B and C it may be seen how the proper choice of gas velocity in accordance with the invention can be made. Assuming that the incoming gas is at about 300°K, (see FIG. 6A) the volumetric free electron density $n_e$ and mixture pressure level P are preferably chosen such that the gas or working medium starts into the laser cavity in region C. If the power input to the gas (in this case electrical power) is, for example, at the low $n_e/P$ end of region C, a rise of about 400°C in gas temperature cannot be tolerated since the population inversion will be destroyed (see FIG. 6C). Accordingly, the flow velocity must be increased, for example, to provide the necessary balance of electrical power input and mass flow such that, for example, only a rise of 100°K is achieved during the flow time through the cavity. If this is done, the working medium will be in region C at both the cavity inlet and outlet, and lasing in accordance with the invention will be provided. Alternatively, if the velocity is not changed, then the ratio $n_e/P$ must be changed to maintain the working medium in region C. Whereas an inlet temperature of 300°K has been used by way of example, it is to be clearly understood that the working medium may, if desired, be cooled and introduced at lower temperature with all of the advantages inherent therein.

Increasing the gas velocity beyond this point decreases the gas temperature attained at the cavity exit and some small rise in efficiency may be obtained. However, if this is done another inefficiency now becomes important at a rate directly proportional to the flow velocity. This further inefficiency results from the fact that the gas flowing out of the laser channel has been lasing, and hence is vibrationally excited. This flow of energy is a loss to the laser system, and is especially important in flowing lasers where, for example, the ratio of flow area to mirror area is large. The preferred embodiment was operated generally in the range $10^{11} < n_e/P < 10^{13}$, which was found most efficient for operation up to exit gas temperatures of about 600°K.

It will now be clear that increasing flow velocity from some minimal value will raise the volumetric laser overall efficiency in the cavity only up to the point where the gas temperature at the laser exit is maintained at a value such that the gain is substantially proportional only to the upper state population $X_U$, there being only a small reduction in gain due to, for example, the presence of a finite lower state population $X_L$. Further increases in flow velocity will reduce $X_L$ toward zero, but, as previously pointed out, also results in an undesirable increase in the flow of vibrationally excited gas out the exit of the cavity. In flowing lasers where this latter energy loss is an appreciable fraction of the laser output, the flow velocity required for maximum laser efficiency is reached when the increase in laser efficiency (by producing a smaller lower state population $X_L$) resulting from an increased flow speed is just offset by the decrease in laser efficiency due to the resulting increase in convection out of the laser of the upper state population, $X_U$. At this point the flow velocity is optimized for laser efficiency in accordance with the invention by providing the required match of electrical power input and gas mass-flow.

The preceding assumes that the pressure P has remained about constant and that the electric discharge producing the excitation has remained a uniform discharge. Broadly, in the development of the invention it was found that spatially uniform discharges, as and for the purposes more fully described hereinafter, will produce efficient high-power laser output up to about the point where enough electrical energy has been added to the gas by the discharge to roughly raise the initial gas temperature to some limit (about 600°–700°K for the embodiment described herein) by Joule heating of the gas in the discharge in the time required for a discrete portion of the gas to flow through the laser section (flow time). It should be noted that this gas temperature limit is compatible with the above-described flow velocity/gas temperature relationship.

Beyond the aforementioned apparent limit for maximum obtainable efficiency the discharge was found to tend to become non-uniform and while lasing action does not cease the process becomes less efficient. However, this limit, as noted above, goes up with increasing pressure and gas velocity. Thus, in accordance with the invention as the pressure, flow velocity and scale size are increased more and more power may be added to the gas while still providing a uniform discharge and hence efficient high-power lasing action at higher and higher output levels.

For any given operating conditions below the limit of obtainable spatially uniform discharges, the choice of flow velocity depends on parameters associated with the lasing cavity more fully described hereinafter. For example, in the case of closed cycle operation of the flowing laser, the power required for the blowers or pumps used to recycle the gas through the laser cavity and cooling means increases as the cube of the flow Mach number and it can be easily shown that the pump power requirements for a closed cycle system indicate that a low Mach number is desirable. Thus, for a Mach number equal to 0.2 the pump power required to overcome the pressure loss is approximately only one-fifth the laser output obtained from an $N_2$-$CO_2$-He cavity, and while at Mach 2.0 the required pump power is at least 20 times this laser output. For open cycle operation, however, high speed flows are not inherently disadvantageous. Therefore, high speed flows (in excess of Mach 1.0 for open cycle system) can be advantageous and allow the laser cavity pressure to be less than one atmosphere and also have the working medium exhaust directly to the atmosphere.

In the experiments conducted in the development of the present invention it was found that a Mach number range of 0.05 to 0.6 is adequate for efficient laser operation.

Attention is now directed to the necessity of providing a uniform discharge. As has been shown above, the use of flow for gas temperature control within the limits noted above allows dimensional scaling independent of pressure level with the concurrent advantage that in a device of fixed dimension using a suitable flow velocity for gas temperature control, increasing the pressure level permits an increase in the output power of the laser. However, at such high pressures the discharge must remain uniform and not change to arcs, streamers, and/or spokes. Moreover, the discharge at such high pressure must be able to sustain, without spoking, the electric fields required for laser operation.

Figure 4:
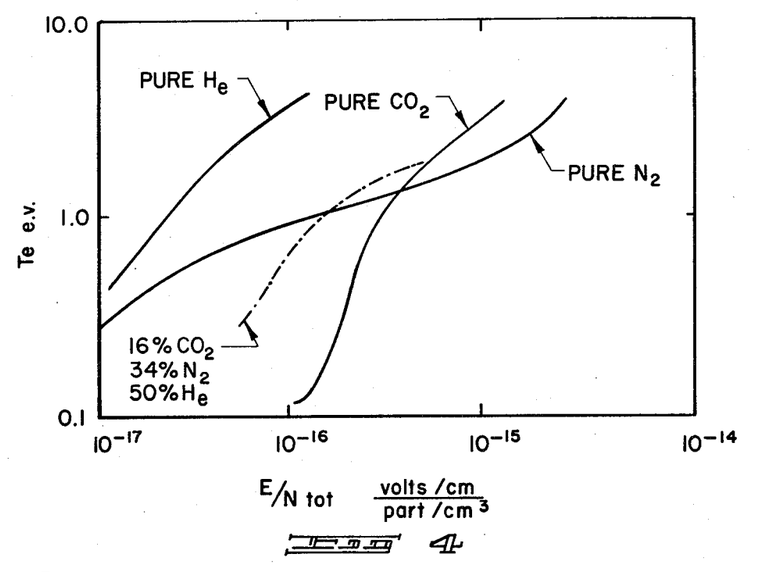
FIG. 4 is a plot of electron temperature as a function of E/N for a mixture of pure helium, carbon dioxide, nitrogen, as well as a typical gas mixture used in electric $N_2/CO_2/He$ gas lasers.

Data exists in the literature as to the average electron energy (herein called electron temperature) attained in electric discharges in single species gases such as, for example, pure $N_2$, $CO_2$, He and the like. As was done in the development of the present invention, this data may be used to predict the electron temperature in a gas discharge containing, for example, a mixture of single species gases. This procedure should use the idea described above as to energy gain and loss for an electron-atom collision in an applied electric field. Thus, given the data of electron temperature, $T_e$, and drift velocity, $W_d$ vs E/N for each gas in question calculation can be made of $T_e$ and $W_d$ vs E/N for any mixture of these gases. The electron temperature for pure $N_2$, $CO_2$, He, and a mixture of 16% $CO_2$, 34% $N_2$, and 50% He obtained in accordance with the above teaching is shown in FIG. 4. As may now be evident substantially any gas or combination of gases such as CO, NO, $H_2$, AR, $NO_2$, $N_2O$ and the like may be handled in the manner discussed hereinabove and other gases may be added if required or desired.

Using as a starting point the literature on sealed-off diffusion-dominated $N_2$-$CO_2$ lasers, it was determined that a ratio of $N_2$ to $CO_2$ pressures of about 2:1 was optimum for power output and generally that more helium than either $N_2$ or $CO_2$ should be used. A mixture of between 10 percent and 50 percent helium with the remaining gas being two parts $N_2$ to one part $CO_2$ was found satisfactory.

Figure 5:
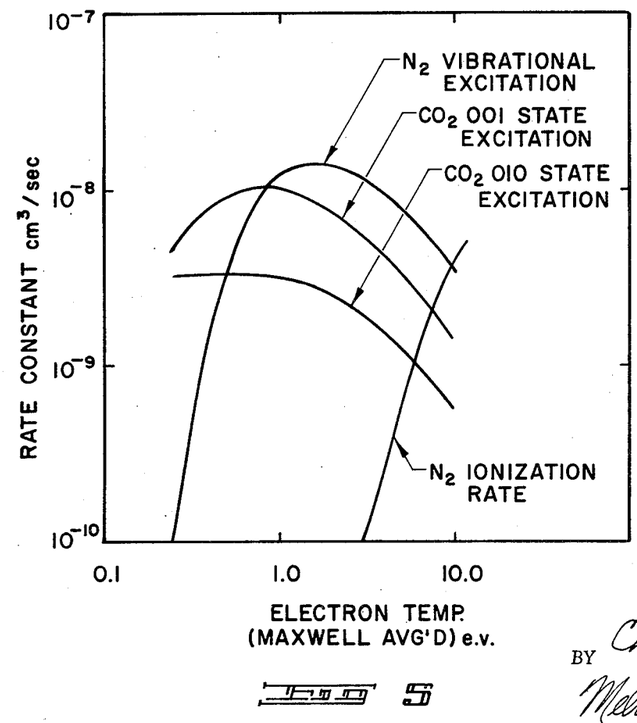
FIG. 5 is a plot of rate constant as a function of electron temperature for upper and lower laser levels of $CO_2$ and vibrationally excited $N_2$.

The cross sections for direct excitation of the upper and lower laser levels of $CO_2$ by electron impact have been published along with those for vibrational excitation of $N_2$. These cross sections converted to excitation rates are shown in FIG. 5. FIG. 5 shows that electron temperatures of the order of 0.80 to 1.50 electron volts is optimum for direct excitation of the upper laser level of $CO_2$ (the 001 state) and the first vibrational level of $N_2$ ($V=1$) which efficiently transfers its energy to the $CO_2$ 001 state.

For the above mixture an E/N of about $1-3 \times 10^{-16}$ volts per centimeter per particle per cubic centimeter yields an electron temperature of about 1 eV.

From the above it may now be seen that for optimum operation of the $N_2$-$CO_2$ system, for example, the preferred region of operation is one where the rate of energy loss from the electrons in the discharge is dominately due to vibrational excitation of the $N_2$ and $CO_2$ and that, accordingly, the electron temperature should be fixed at about 1 eV. This requirement, however, is at least in some cases incompatible with the requirement that in a DC diffusion dominated laser where for reasons of discharge uniformity the production rate of electrons must exactly balance the net rate of electron loss. Where the latter situation is the case the electron temperature is tied to the pressure level and tube size and is not necessarily 1 eV.

The provision of the two discharge pumping techniques used in the preferred embodiment circumvents the above limitation by essentially applying two successive discharges to the gas as it flows through the channel.

Broadly, in the preferred embodiment the first discharge creates the electron density uniformly using only a small amount of energy while the second discharge provides a voltage to give these electrons a temperature sufficiently high for laser action but not high enough to generate any appreciable increase in electron density. The second or sustainer discharge puts the dominant amount of energy into the gas directly where it is desired. In the case of the $N_2$-$CO_2$ laser the energy is put into the upper laser state of $CO_2$ and into Nitrogen vibration, the optimum electron temperature assuring optimum laser efficiency. Upon creation by the first discharge of a uniform electron-ion cloud, the cloud stays uniform during the time of the second discharge as long as the second discharge does not rapidly create electrons by self-regenerative ionization. If the level of the second or sustainer discharge is raised to the point where it too produces a rapid ionization, then discharge nonuniformities may be created. However, provision of a second or sustainer discharge selected to slowly create electrons results in maintenance of stable uniform discharge for several flow times. This slow creation of electrons by the second discharge nearly balances the loss of electrons produced by the first discharge due to flow and recombination electron losses and must not substantially increase the level of ionization as this will result in a nonuniform electron density such as arcing.

As will not be apparent, the present invention permits the provision in a flowing gas laser of a spatially uniform discharge at the optimum electron temperature required for efficient laser operation at arbitrary pressure levels and physical sizes. While the invention is not so limited, this may be accomplished by utilization of the aforementioned two-step discharge comprising, preferably, first a fast high-voltage discharge which creates a uniform electron density which would ordinarily, if left on its own, disappear by volumetric processes while flowing out of the channel and be incapable of producing efficient high power laser action. However, a second lower voltage discharge is provided which gives the electrons produced by the first discharge the necessary electron temperature for preferably optimum laser excitation, with no significant increase in electron density.

It is to be understood that the invention is not limited to the apparatus shown and described and that, for example, other methods of and apparatus for creating the initial electron density can be used such as ultraviolet radiation, a high energy beam of electrons, protons and the like provided by electron beam means for introducing one or more electron beams to produce ionization of the gaseous medium as and for the purposes set forth hereinabove. Irrespective of whether the electrons are generated in the above described manner or any other suitable manner, they must be heated to the correct electron temperature by the E/N applied by the sustainer discharge.

Attention is again directed to FIGS. 1-3 which are illustrative of the preferred embodiment actually reduced to practice and which incorporated the previously described two-step pulser-sustainer discharge in a gaseous mixture of $N_2$, $CO_2$ and He.

Because of the rather high voltages that may be required for the pulser circuit shown and described for producing a first discharge, sufficient voltage standoff distances must be provided both upstream and downstream of the electrodes to assure current flow in the gas only in the proper direction in the pulser circuit. In lasers, in accordance with the invention, this may be accomplished, as previously pointed out, by, for example, fabricating the working section itself of strong, electrically nonconductive material such as, for example, Melamine or fiberglass impregnated with an epoxy. Since lasers in accordance with the present invention are scalable, large channels, for structural reasons, may require metallic walls. In this case the internal surfaces in at least the area of the discharge must be sheathed with a suitable nonconducting material such as, for example, quartz and the like.

Where metallic mirrors are used it is important that they not be located too close to the discharge area as the electrodes adjacent to the mirrors will tend to discharge into them rather than through the flowing gas as desired. Accordingly, a sufficient voltage standoff distance of the mirrors from the discharge is required to prevent an undesired discharge to the mirrors. A separation of the mirrors from the electrodes of about one or two anode-to-cathode distances has been found satisfactory. The gas in the region intermediate the mirrors and the electrodes may be flowing, recirculating or simply static, although a flowing gas is preferred.

It is significant to note that the direction of current flow as shown in FIG. 1 is parallel to the gas flow direction (in the X direction). This arrangement is preferred as it avoids the problem of discharge blowout. As is well known, a discharge struck perpendicular to a high speed gas flow is not directly across the anode-to-cathode gap but the current path is blown downstream and the higher the gas velocity the greater the current path distortion. As will now be obvious, with the current paths chosen parallel to the gas flow in accordance with the invention, this problem is not encountered.

If the electrode axes are chosen, for example, in the Z direction even though current flow in the X direction is maintained, the resultant current sheets and their associated gas density gradients tend to cause refractive effects on the laser beams in the cavity and result in an inferior output laser beam that is not of the highest focusing ability. However, it is to be noted that an orientation of the electrode axes in the Z direction is useable but that orientation of the electrode axes in the Y direction is preferable since it eliminates, inter alia, the aforementioned refractive problems and difficulties.

The transverse electrode spacing (the distance between electrodes in the Z direction) should be chosen so that the ambipolar diffusion in the Z direction is just sufficient to cause adjacent current sheets to merge, even at high pressures and high flow velocities so that all of the gas flowing through the working region undergoes the excitation process and is thereby made available for lasing. For any given case, a suitable transverse (Z-direction) spacing may be calculated by use of the ambipolar diffusion time, the anode-cathode spacing, and electrode diameters.

Cathode electrodes have a greater voltage drop during operation and hence they provide correspondingly greater heating than anode electrodes. For this reason the cathode electrodes should be placed at about the exit of the laser cavity downstream of the anode electrodes. Such an arrangement has the advantage of providing a cooler gas temperature for the lasing medium in the working region and hence a more efficient laser process. In actual tests, discharges that would just marginally produce laser action with the embodiment shown in FIG. 1 were found not to produce laser action at all when the cathodes were located upstream of the laser cavity or working region.

The electrodes may be cylindrical in shape and as previously described are embedded in the walls of the working region to insure that a uniform discharge from the cylindrical surfaces will be struck between the anode and cathode electrodes. If the tips of the electrodes are not protected as by embedding in the walls, one may expect a preferential discharge from the tips of the electrodes which tend to result in a spatially nonuniform discharge and consequent poor lasing qualities.

It is to be noted that the configuration of the electrodes is not limited to cylindrical electrodes and that other configurations may be used. For example, an air-foil shape with polished surfaces (not shown) may be used. An air-foil configuration has the advantage of reducing the pressure drop due to the aerodynamic drag of the electrodes. Further, the electrodes should be spaced as closely together as possible as this will tend to result in the entire electrode assembly acting as a "hollow cathode," thereby permitting the ultraviolet radiation inherent therewith to be used to augment electron removal from the metal surfaces over that resulting from the cathode voltage drop. Still further, the larger emitting surfaces of air-foil electrodes provide the additional advantage of helping current emission in terms of lower cathode voltage drop requirements. As to electrode materials, suitable electrodes have been formed from tungsten and copper. As may be expected, tungsten and therefore other refractory metals proved to have a much longer life because of their high ablation temperature and relatively high thermal conductivity.

To insure that each anode-cathode pair in the sustainer circuit carries current, each such anode-cathode pair preferably should have its own capacitor as its energy source. Insurance that each individual electrode pair will carry current may also be accomplished by heavily ballasting each such anode-cathode pair with high resistance elements and driving all of the electrodes with a single large capacitor or even directly from the power supply. However, this latter approach is generally wasteful of power due to the ohmic dissipation in the large ballast resistors that are required. Both the above methods may be used, as might other circuit configurations and elements, as, for example, induction elements in place of or in addition to, resistor/capacitor combinations the choice of which will be dictated by the specific application. The capacitors for the sustainer anode-cathode circuits should be of such a size that they will not be appreciably discharged if the sustainer circuit operates on a pulse basis. A decrease of 5 to 10 percent of the initial voltage has been found satisfactory. The sustainer power supply, which may be of conventional configuration, must be of sufficient capacity to recharge the sustainer capacitors before the next pulse of current is required from the capacitors. Accordingly, the required charging time will be determined by the repetition rate required of the discharge pulses. This in turn depends on the use to which a laser in accordance with the invention is to be put. High repetition pulse rates produce an essentially DC laser output while low repetition rates, as may be required in some instances, produce a pulsed output. A sustainer discharge of the order of milliseconds in duration has been found satisfactory, hence the inductance of the circuit gives rise to very small voltage drops. The voltage that need be applied across the sustainer capacitors is determined by the E/N considerations mentioned previously herein as well as the cathode and anode drops measured for the given electrode geometry, material, surface condition, current density and pressure level.

Accordingly, while the pressure level, gas constituents, electrode spacing and electron temperature requirements give the required voltage drop across the positive column of the discharge, the actual voltage applied to the capacitors in the sustainer circuit may be some hundreds of volts higher due to electrode drops. If the sealing of the laser and operating conditions are such that kilovolts are determined to be necessary for laser action then, of course, hundred-volt electrode drops will be unimportant. If, however, it is determined that only hundreds of volts are required across the positive column, then some amount of empiricism may be required to provide the most suitable capacitor voltage.

The pulser circuit comprises the aforementioned pulser anodes and cathode electrodes. A conventional high voltage power supply is coupled to a charging circuit coupled to the pulser circuit anodes via a trigger circuit. The pulser circuit power supply may comprise a conventional DC voltage supply capable of providing 1–20 kV or more. The charging circuit is coupled to the power supply and may comprise a capacitor in series with a limiting resistor (not shown). The trigger circuit may comprise a conventional spark gap (not shown) with a trigger electrode coupled to a conventional oscillator or the like adapted to supply the desired pulse voltage, pulse length and repetition rate. The shape of the fast high-voltage pulse (i.e., rise-time, decay time, and voltage and current magnitude) was found important for laser efficiency in some operating regimes, pulse shape was influenced by the inclusion of pulse-shaping resistors (not shown) in the pulser circuit. Suitable values of these resistors vary with, for example, pressure level in the laser channel and pulser-circuit (energy storage) capacitance.

As the working gas enters the working region at Mach numbers of, for example, 0.05–0.60 and pressures of 5–50 torr, it passes through the high voltage pulser electrodes maintained at a high voltage of, for example, 1–20 kV. It is at this point (at or just downstream of the pulser anode electrodes) that the required initial spatially uniform electron density is created. The electrons so produced together with the balance of the plasma created by the pulser circuit discharge then passes through the sustainer anode electrodes where the electrons are heated to the electron temperature required for the gas being used such that, for the case of the $N_2$-$CO_2$-He gas mixture for example, the upper laser levels of $N_2$ and $CO_2$ are preferentially excited by electron impact for maximum laser efficiency. For a laser or oscillator the laser energy may be extracted in the conventional manner by the mirrors disposed at each end of the cavity bounded by the sustainer and ground electrodes and the sidewalls of the frame. For an amplifier, the mirrors may be replaced by suitable windows to permit the required light beam to pass through the cavity and be amplified in conventional manner.

While the voltage of the sustainer circuit has been successfully operated at voltages of the order of 1000 volts or less and may be applied continuously, the pulser circuit voltage has been successfully applied with no lack of uniformity in the discharge at the rate of, for example, 100 pulses/second with a pulse width of from 20–100 nanoseconds, up to a rise time of as long as one microsecond and a decay time of several microseconds. Satisfactory operation has been obtained with the pulser circuit voltage being applied as little as once every two or three flow times, i.e., the time it takes for the gas to flow from the sustainer circuit anodes to the grounded cathode electrodes. Time scales of the order noted above may be expected with other gases such as, for example, $CO_2$, NO, $N_2O$, $NO_2$, $SO_2$, HCl, HBr, HI, HF, Ar, and the like.

In tests it was found that for the $N_2$-$CO_2$-He laser referred to hereinabove, with a single pulser circuit capacitor of 0.003 microfarads, optimum lasing occurred as pulser voltages (across a 2 inch gap in the X direction) of 15 kV for a pressure of 15 and 30 torr and at a pulser voltage of 20 kV for 45 torr. Further, the pulser circuit voltage required depends, at least in part, on the size of the gap. It was also found that increasing the pulser circuit capacitor by a factor of 7 and hence increasing the pulser circuit energy input by a factor of 7 increased the sustainer circuit energy input and hence laser output by only a factor of 2. At such a point the entire system is becoming less efficient because the pulser energy input approaches the sustainer circuit input. It was further found that in the initial part of the sustainer circuit pulse, high currents were present due to the high initial electron density produced by the pulser circuit. As these electrons disappear by volume recombination the sustainer circuit current falls and finally the sustainer discharge quenches. Laser radiation showed an initial period of about 10–30 microseconds where no lasing action took place. Then, a threshold appeared to be crossed and the laser turned on. At this point the laser output time history closely followed the current input time history.

Exemplary operating parameters for an embodiment actually reduced to practice are set forth in Table 1 below.

TABLE 1

| | |
|---|---|
| Laser Positive Column Efficiency | To 30% |
| Output Wavelength | 10.6 $\mu$ |
| Output Coupling | 4% |
| Peak Pulsed Output Power | 50 to 1000 Watts |
| Repetition Rate | 1 to 100 pps |
| Pulse Width (Pulser Circuit) | 20 to 100 nanoseconds (to several microseconds) |
| Pulse Width (Sustainer Circuit) | To 6 Milliseconds |
| Gas | 16% $CO_2$, 34% $N_2$, 50% He |
| Input Pressure | 15 torr (15 to 45 torr) |
| Input Velocity | 0.2 Mach (0.05 to 0.6 Mach) |
| Laser Cavity Size | 2.54 cm wide ×2.54 cm high × 30 cm long |
| Electrodes | 44 tungsten pulser circuit anodes 44 tungsten sustainer circuit anodes 44 tungsten common cathodes |
| Pulser Circuit: | |
| High Voltage Power Supply | 20Kv at 1 milliamp |
| Charging Resistors | 50K to 500K ohms |
| Pulse Shaping Resistors | 720 ohms |
| Energy Storage Capacitor | 0.003 to 0.030 $\mu$fd |
| Pressurized Spark Gap | 0.60 cm gap width |
| Trigger Circuit | 1–100 pps |
| Sustainer Circuit | |
| Power Supply | 3Kv at 6 amps |
| Resistors | 20K ohms |
| Capacitors | C = 1 $\mu$fd |
| Ballast Resistor for Each Electrode Pair | 500 ohms |

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from the spirit and scope of the invention defined by the following claims.

I claim:

1. In the method of producing a spatially uniform discharge substantially throughout a gaseous working medium in a working region, the steps comprising:
   a. providing a gaseous working medium at a pressure in a working region that upon the production of free electrons in said medium said medium has ambipolar and thermal diffusion rates incapable of substantially damping local increases in said free electron density in said medium;
   b. generating substantially throughout said working region a substantially spatially uniform density of free electrons in said medium by ionizing said medium; and
   c. providing a sustainer field for providing substantially uniformly throughout said working region a predetermined electron temperature effective to increase the average energy of said free electrons without substantially increasing said predetermined electron density by self-regenerative ionization, said electron temperature producing said discharge substantially uniformly throughout said working region at a predetermined level.

2. The method as defined in claim 1 and additionally including maintaining the level and uniformity of both the density and temperature of said medium at values less than that which will produce substantial arcing in said medium.

3. In the method of producing a spatially uniform discharge substantially throughout a gaseous working medium in a working region, the steps comprising:
   a. passing said gaseous working medium at a pressure through a working region that upon the production of free electrons in said medium said medium has ambipolar and thermal diffusion rates incapable of substantially damping local increases in secondary electron density in said medium;
   b. generating substantially throughout said working region a substantially spatially uniform density of free electrons in said medium by ionizing said medium;
   c. providing a sustainer field for providing substantially uniformly throughout said working region a predetermined electron temperature effective to increase the average energy of said free electrons without substantially increasing said predetermined electron density by self-regenerative ionization; and
   d. maintaining the average energy of said free electrons and the level and uniformity of both the density and temperature of said medium at values to produce said spatially uniform discharge in said medium.

4. The method as defined in claim 3 wherein said free electrons are generated with an average energy insufficient to produce self-regenerative ionization but with a density sufficient to support said discharge.

5. The method as defined in claim 4 wherein the average energy of said free electrons is less than that which will produce a non-uniform discharge.

6. The method as defined in claim 5 wherein said working region is in a cavity and the level and uniformity of the density and temperature of said medium are respectively maintained at values that for an average energy of said free electrons less than that which will produce a non-uniform discharge, produce said spatially uniform discharge in said medium during flow through said cavity.

7. In apparatus for producing a spatially uniform discharge substantially throughout a gaseous working medium in a working region, the combination comprising:
   a. gas supply means for producing a flow of a gaseous working medium having a predetermined velocity and pressure;
   b. means defining a working region for receiving said medium from said gas supply means and through which said flow passes, said working region defining a predetermined cross section and volume that at said pressure said gaseous working medium in said working region has ambipolar and thermal diffusion rates incapable of substantially damping local increases in electron density in said medium;
   c. first means for producing substantially throughout said working region a substantially spatially uniform density of free electrons in said medium by ionizing said medium; and
   d. second means for providing a sustainer field for controlling the electron temperature of said free electrons in said medium to substantially uniformly throughout said working region increase their average energy without substantially increasing the density thereof by self-regenerative ionization at said velocity and pressure and produce said discharge substantially uniformly throughout said working region.

8. The combination as defined in claim 7 wherein said first means produces said free electrons with an average energy insufficient to produce self-regenerative ionization but with a density sufficient to support said discharge; and said second means includes means for producing an electric field in said working region.

9. The combination as defined in claim 7 wherein said first and second means serially provide said discharge in the form of pulses, said medium having a flow time through said working region that is long compared to the time of each of said pulses.

10. The combination as defined in claim 9 wherein said working region is in a cavity said means defining said cavity includes gas inlet and gas outlet means and said second means includes electrode means disposed intermediate said gas inlet and outlet means for producing a substantially uniform electric field substantially throughout said working region.

11. In the method of light generation by stimulated emission of radiation in a working region having a longitudinal axis the steps comprising:
   a. providing a gaseous working medium having an upper and a lower laser state in said working region;
   b. providing a substantially spatially uniform predetermined density of free electrons in said medium substantially throughout said working region;
   c. providing a sustainer field for providing substantially uniformly throughout said working region a predetermined electron temperature effective to increase the average energy of said free electrons without substantially increasing said predetermined electron density by self-regenerative ionization, said electron temperature producing an average energy level sufficient to support a population inversion in said medium; and
   d. providing a pressure of said medium in said working region to produce a population inversion in said medium in said working region.

12. The method as defined in claim 11 wherein said electron density and gas pressure and flow velocity through said working region are selected to produce substantially maximum population inversion in said medium in said working region.

13. The method as defined in claim 11 wherein said working region is in a cavity.

14. The method as defined in claim 13 wherein said gaseous working medium is a mixture of helium, nitrogen and carbon dioxide.

15. The method as defined in claim 14 wherein said medium comprising said mixture is introduced into said cavity at about 300° Kelvin and is exhausted from said cavity at about 600° Kelvin.

16. In the method of light generation by stimulated emission of radiation in a working region in a cavity having a gas inlet, a gas outlet and a longitudinal axis the steps comprising:

a. passing a gaseous working medium having an upper and a lower laser state through said working region in a direction orthogonal to said axis;
b. providing a substantially spatially uniform predetermined density of free electrons in said medium substantially through said working region;
c. providing a sustainer field for providing substantially uniformly throughout said working region a predetermined electron temperature effective to increase the average energy of said free electron without substantially increasing said predetermined electron density by self-regenerative ionization, said electron temperature producing an average energy level sufficient to support a population inversion in said medium; and
d. providing a velocity and pressure of said medium in said working region to produce a population inversion in said medium in said working region wherein any increase in population inversion due to a decrease in the population of said lower laser state resulting from substantially any further increase in gas velocity is not substantially less than any decrease in population inversion resulting from the increase in flow of said upper laser state out of said working region.

17. In the method of light generation by stimulated emission of radiation substantially throughout a gaseous active medium in a working region in a cavity having a gas inlet, a gas outlet and a longitudinal axis the steps comprising:
a. providing a gaseous active medium at a pressure in a working region disposed in a cavity having walls for confining the gaseous working medium that upon the production of free electrons in said medium said medium has ambipolar and thermal diffusion rates incapable of substantially damping local increases in free electron density in said medium, said medium having an upper and lower laser state;
b. generating substantially throughout said working region a substantially spatially uniform predetermined density of free electrons in said medium having an average energy insufficient to produce a population inversion in said medium; and
c. providing a sustainer field for providing substantially uniformly throughout said working region a predetermined electron temperature effective to increase the average energy of said free electrons without substantially increasing said predetermined electron density by self-regenerative ionization, said electron temperature producing an average energy level sufficient to support a population inversion in said medium.

18. The method as defined in claim 17 wherein said medium is passed through said cavity orthogonal to said axis and said sustainer field is an electric field both orthogonal to said axis and anti-parallel to the direction of flow of said medium.

19. The method as defined in claim 17 wherein said sustainer field is en electric field both orthogonal to said axis and parallel to the direction of flow of said medium.

20. The method as defined in claim 17 wherein said free electrons are provided by means of a discharge.

21. The method as defined in claim 20 wherein said discharge is provided in the form of pulses whereby said spatially uniform density of free electrons is sequentially provided at discrete spaced intervals of time.

22. The method as defined in claim 21 wherein each of said pulses is provided for a time that is short compared to the time required for said gas to flow through said working region.

23. The method as defined in claim 21 wherein each of said pulses is provided for a time of less than about 10 microseconds.

24. The method as defined in claim 17 wherein said working region has a longitudinal axis and said medium is passed through said working region substantially uniformly all along and orthogonal to said axis; and said sustainer field is an electric field orthogonal to said axis and parallel to the direction of flow of said medium.

25. The method as defined in claim 24 wherein said free electrons are provided by means of an electrical discharge.

26. The method as defined in claim 25 wherein said discharge is serially provided in the form of pulses and the energy added to the medium by said pulses is small compared to the energy added to the medium by said electric field.

27. The method as defined in claim 26 wherein each of said pulses is provided for a time that is short compared to the time required for said gas to flow through said working region and each of said discharges is provided by a voltage that is high compared to that of said electric field.

28. The method as defined in claim 27 wherein each of said pulses is provided for a time of less than about ten microseconds.

29. The method as defined in claim 24 wherein said medium is passed through said cavity at less than supersonic velocity.

30. In high powered laser apparatus the combination comprising:
a. gas supply means for producing a flow of a gaseous medium having a predetermined velocity and pressure and an upper and lower laser state;
b. means defining a cavity including a working region for receiving said medium from said gas supply means and through which said flow passes;
c. first means for producing a spatially uniform density of free electrons in said medium substantially throughout said working region by ionizing said medium, said free electrons having an average energy insufficient to produce a population inversion in said medium; and
d. second means for providing a sustainer field for controlling the electron temperature of said free electrons in said medium to substantially uniformly throughout said working region increase their average energy without substantially increasing the density thereof by self-regenerative ionization at said velocity and pressure and produce a population inversion in said medium in said working region.

31. In high powered laser apparatus the combination comprising:
a. gas supply means for producing a flow of an ionizable gaseous medium having a predetermined velocity and pressure;

b. means defining an elongated optical cavity having a longitudinal axis, said means receiving said medium from said gas supply means in a direction orthogonal to and extending along the length of said axis and through which said flow passes;

c. first means for ionizing said medium and produce a uniform density of free electrons in said medium, said electrons having an average energy insufficient to produce a population inversion in said cavity; and d. second means for producing an electric field in said medium containing said free electrons to increase the average energy of said electrons produced by said first means without substantially increasing the density of said electrons by self-regenerative ionization and produce a population inversion in said medium during flow through said cavity at said velocity and pressure.

32. The combination as defined in claim 31 wherein said first means includes further means for providing a discharge in said medium for a time that is short compared to the time required for said medium to flow through said cavity.

33. The combination as defined in claim 32 wherein said discharge is provided for a time less than about 10 microseconds.

34. The combination as defined in claim 32 wherein said further means serially provides said discharge in the form of pulsed and adds energy to said medium in an amount that is small compared to that of said second means.

35. The combination as defined in claim 34 wherein said second means further includes means for providing the majority of the energy input to said medium.

36. The combination as defined in claim 35 wherein said means defining said cavity includes gas inlet and gas outlet means and said second means includes first and second electrode means disposed intermediate said gas inlet and outlet means, said longitudinal axis being disposed intermediate said first and second electrode means.

37. The combination as defined in claim 36 wherein said first means includes third electrode means disposed upstream from said axis.

38. The combination as defined in claim 37 wherein said second electrode means are cathodes electrodes common to said first and second means and are disposed downstream of said first electrode means.

39. The combination as defined in claim 37 wherein said first, second and third electrode means comprise rods spaced one from another extending across said cavity orthogonal to said longitudinal axis and disposed along the length of said axis.

40. The combination as defined in claim 35 wherein said cavity includes end walls having means for passing a light beam through said cavity parallel to said axis and downstream of said first electrode.

41. In high powered laser apparatus the combination comprising:

a. gas supply means for producing a flow of an ionizable gaseous medium having a predetermined velocity and pressure, said medium having an upper and a lower laser state;

b. means defining an elongated cavity having a longitudinal axis, said means receiving said medium from said gas supply means in a direction orthogonal to and extending along the length of said axis and through which said flow passes; said cavity including oppositely disposed end walls having means defining an optical cavity parallel to said axis;

c. first means for ionizing said medium and produce substantially throughout said optical cavity a uniform density of free electrons in said medium; and d. second means for producing substantially throughout said optical cavity an electric field in said medium containing said free electrons to increase the average energy of said electrons without substantially increasing the density of said electrons by self-regenerative ionization and produce a population inversion in said medium during flow through said optical cavity.

42. The combination as defined in claim 41 wherein said first means includes further means for providing a discharge in said medium for a time that is short compared to the time required for said medium to flow through said optical cavity.

43. The combination as defined in claim 42 wherein said discharge is provided for a time less than about 10 microseconds.

44. The combination as defined in claim 42 wherein said further means serially provides said discharge in the form of pulses and adds energy to said medium in an amount that is small compared to that of said second means.

45. The combination as defined in claim 44 wherein said second means further includes means for providing the majority of the energy input to said medium.

46. The combination as defined in claim 45 wherein said means defining said cavity includes gas inlet and gas outlet means and said second means includes first and second electrode means disposed intermediate said gas inlet and outlet means, said longitudinal axis being disposed intermediate said first and second electrode means.

47. The combination as defined in claim 46 wherein said first means includes third electrode means disposed upstream from said axis.

48. The combination as defined in claim 47 wherein said second electrode means are cathodes electrodes common to said first and second means and are disposed downstream of said first electrode means.

49. The combination as defined in claim 47 wherein said first, second and third electrode means comprise rods spaced one from another extending across said cavity orthogonal to said longitudinal axis and disposed along the length of said axis.

50. The combination as defined in claim 46 wherein said means defining said optical cavity comprises means for passing a light beam through said cavity parallel to said axis and downstream of said first electrode means.

* * * * *

UNITED STATES PATENT OFFICE
CERTIFICATE OF CORRECTION

Patent No. 3,721,915     Dated March 20, 1973

Inventor(s) James P. Reilly

It is certified that error appears in the above-identified patent and that said Letters Patent are hereby corrected as shown below:

Column 8, line 21, for "tops", read --tips--; Column 10, line 21, for "$\rho UC_p (\delta T_o/\delta x) + (1/r)(\delta/\delta r) r\lambda (\delta T/\delta r) = Q$", read -- $\rho UC_p(\partial T_o/\partial x) + (1/r)(\partial/\partial r) r\lambda (\partial T/\partial r) = Q$ --; Column 11, line 48, for "$(X_L > X_L)$" read --$(X_U > X_L)$--; Column 18, line 45, for "sealing", read --scaling--; Colimn 23, claim 19, line 2, for "en" read --an--; and Column 25, claim 34, line 3, for "pulsed" read --pulses--.

Signed and sealed this 18th day of December 1973.

(SEAL)
Attest:

EDWARD M. FLETCHER, JR.
Attesting Officer

RENE D. TEGTMEYER
Acting Commissioner of Patents